United States Patent [19]
Boroson

[11] Patent Number: 5,822,103
[45] Date of Patent: Oct. 13, 1998

[54] SIGNAL GENERATION USING OPTICAL PULSES

[75] Inventor: Don M. Boroson, Needham, Mass.

[73] Assignee: Massachusetts Institute of Technology, Cambridge, Mass.

[21] Appl. No.: 770,177

[22] Filed: Dec. 19, 1996

[51] Int. Cl.[6] .................................................. H04B 10/04
[52] U.S. Cl. ........................................ 359/184; 359/181
[58] Field of Search .................................. 359/173, 181, 359/184–186, 188, 264; 385/16; 375/239, 242

[56] References Cited

U.S. PATENT DOCUMENTS

| | | | |
|---|---|---|---|
| H353 | 10/1987 | Taylor | 340/347 AD |
| 4,446,425 | 5/1984 | Valdmanis et al. | 324/77 K |
| 5,010,346 | 4/1991 | Hamilton et al. | 341/137 |
| 5,017,793 | 5/1991 | Halsey et al. | 250/551 |
| 5,146,075 | 9/1992 | Kim et al. | 250/211 |
| 5,155,352 | 10/1992 | Kim et al. | 250/211 |
| 5,280,168 | 1/1994 | Kim et al. | 250/214 |
| 5,548,433 | 8/1996 | Smith | 359/188 |
| 5,625,727 | 4/1997 | Liedenbaum et al. | 359/188 |

OTHER PUBLICATIONS

L. Goldberg et al., "Generation and Control of Microwave Signals by Optical Techniques" *IEEE Proceed.–J.* 139(4):288–295 (1992).

R.J. Helkey et al., "Millimeter–Wave Signal Generation Using Semiconductor Diode Lasers" *Micro. & Optical Tech. Lett.* 6(1):1–5 (1993).

D.C. Ni et al., "Use of Picosecond Optical Pulses and FET's Integrated with Printed Circuit Antennas to Generate Millimeter Wave Radiation" *IEEE Photonics Tech. Lett.* 3(3):273–275 (1991).

D. Novak et al., "Millimetre–Wave Signal Generation Using Pulsed Semiconductor Lasers" *Electronics Letters* 30(17):1430–1431 (1994).

D. Novak et al., "Signal Generation Using Pulsed Semiconductor Lasers for Application in Millimeter–Wave Wireless Links" *IEEE Trans. on Microwave Theory & Techniques* 43(9):2257–2262 (1995).

H. Ogawa, "Application of Optical Techniques to Microwave Signal Processing (MSP)—Optical–Microwave Signal Processing" *IEEE Trans. Electron.* E79(1):87–97 (1996).

*Primary Examiner*—Kinfe-Michael Negash
*Attorney, Agent, or Firm*—Testa, Hurwitz & Thibeault, LLP

[57] ABSTRACT

An optical modulator includes an optical pulse train generator that forms an optical pulse train of a predetermined frequency at a generator output. The optical modulator also includes an optical pulse train modifier having a first input optically coupled to the output of the pulse train generator, a second input, and an optical output. The modifier produces a modulated optical pulse train related to a signal appearing at the second input and having an optical sub-carrier frequency related to the predetermined frequency of the optical pulse train at the first input.

23 Claims, 4 Drawing Sheets

SIGNAL GENERATION USING OPTICAL PULSES

GOVERNMENT SUPPORT

This invention was made with government support under Contract Number F19628-95-C-0002 awarded by the Air Force. The government has certain rights in the invention.

FIELD OF THE INVENTION

The invention relates generally to the field of optical and radio frequency modulation and signal generation. In particular, the invention relates to an apparatus for and methods of radio frequency modulation and signal generation using optical pulses.

BACKGROUND OF THE INVENTION

Radio frequency (RF) communications systems, including cellular, wireless, microwave, and satellite media, as well as radar systems, require the generation of an RF signal with a modulation, a spread-spectrum function or other signal features imposed upon it. Generation of such RF signals is typically accomplished by utilizing numerous subsystems operating in sequence. These subsystems include oscillators, 90° hybrid circuits, switches, filters, mixers, equalizers, and upconverters.

Current high-speed, wide-band modulators have limited performance. For example, modulators constructed as multiple-path selectors, such as those using 90° hybrid circuits and fast switches, have imperfect phase or delay offsets between the arms of the hybrid, amplitude mismatch between the arms, circuit reflections, and switching speed limitations.

Direct modulation techniques typically suffer from non-flat modulation responses that require compensation. Other techniques pass sinusoidal signals through a nonlinear or time-varying linear medium in order to impart amplitude, frequency, or phase variations. These techniques often suffer from nonflat responses, especially at very wide modulation bandwidths.

Optical techniques utilizing semiconductor lasers have recently been developed to generate high-speed modulated RF signals. These techniques include frequency multiplication using an optical comb, mixing between CW optical sources, and direct generation using optical oscillators. High-speed modulated RF signals can be generated with an optical comb by first producing short optical pulses by any means including gain switching, Q switching or mode locking. Then, the RF components are filtered to produce the desired signal.

High-speed modulated RF signals can also be generated by mixing between CW optical sources. In this technique, two optical CW sources are first spatially mixed. Then, the resulting signal is detected by a single power detector that generates a beat signal which is at the difference frequency between the two optical sources. In addition, high-speed modulated RF signals can also be generated directly by using passive mode locking or various external modulation techniques to form an RF oscillator with an optical carrier. RF information can then be extracted by power-detection and heterodyne techniques.

These prior art optical techniques of signal generation are capable of generating relatively narrow-band analog signals. However, these optical techniques, as well as the direct RF techniques, are sensitive to modulation system imperfections that reduce system performance at wide modulation bandwidths.

SUMMARY OF THE INVENTION

It is therefore a principal object of this invention to utilize optical pulse technology for generating wide-band analog signals. It is another principal object of this invention to generate wide-bandwidth analog signals that are insensitive to modulation system imperfections.

A principal discovery of the present invention is that ultrafast optical switches and optical logic devices can be utilized to generate a sequence of optical pulses that, when detected by a wide-band optical receiver, give rise to a modulated and/or spread-spectrum waveform with wide fractional bandwidth and good fidelity. Another principal discovery is that extremely wide-bandwidth modulation on an RF carrier can be achieved with almost no sensitivity to modulation system imperfections.

Accordingly, the present invention features an optical modulator that includes an optical pulse train generator that forms an optical pulse train of a predetermined frequency at a generator output. In addition, the optical modulator includes an optical pulse train modifier having a first input optically coupled to the output of the pulse train generator, a second input, and at least one optical output. The pulse train modifier may include an optical switch or an optical logic device.

The pulse train modifier produces one or more "modulated" optical pulse trains that are related to the signal appearing at the second input, and that has an optical subcarrier frequency related to the predetermined frequency of the optical pulse train at the first input. The one or more modulated optical pulse trains may be used independently or may be used simultaneously. The signal appearing at the second input may be data or a pseudo-random signal.

The optical modulator may also include an optical pulse controller having an input and an output. The output of the pulse controller is coupled to the second input of the optical pulse train modifier. The pulse controller produces a modulation-control signal at its output that is utilized by the pulse train modifier to modulate the optical pulse train.

In addition, the optical modulator may include a detector optically coupled to each of the optical outputs of the pulse train modifier. Each detector generates a modulated RF signal at an RF output that corresponds to the modulated optical pulse train generated by the pulse train modifier. The modulated RF signals at the RF outputs of the detectors may be processed, or they may be combined to create a single RF signal. The modulated RF signals may have a fractional bandwidth anywhere between 0–100%.

The detectors may be optically coupled to the outputs of the pulse train modifier by one or more fiber optic cables. One or more electrical filters may be electrically coupled to the RF outputs of the detectors. The filters may be utilized to remove harmonic signals and to provide further spectral shaping. The detectors may be coupled to one or more RF transmitters in a communications or a radar system, or to some other information delivery system.

The present invention also features a radio frequency signal generator, including an optical pulse train generator that forms an optical pulse train of a predetermined frequency at a generator output. The signal generator also includes an optical pulse train modifier that has a first input optically coupled to the output of the pulse train generator, a second input, and an optical output. The pulse train modifier produces one or more modulated optical pulse trains that are related to a signal appearing at the second input and that have an optical sub-carrier frequency related to the predetermined frequency of the optical pulse train at the first input.

The signal generator may also include an optical pulse controller having an input and an output that is coupled to the second input of the optical pulse train modifier. The pulse controller produces a modulation control signal at the output that is utilized to modulate the optical pulse train at the first input of the pulse train modifier.

In addition, the signal generator includes one or more detectors that are optically coupled to the optical outputs of the pulse train modifier. Each detector generates a modulated RF signal at an RF output corresponding to one of the modulated optical pulse trains that are generated by the pulse train modifier. RF signals from multiple detectors may be combined to form a single RF signal. The signal generator may also include electrical filters electrically coupled to the outputs of the detectors for removing harmonic signals and for providing spectral shaping. The output of the detectors may be electrically coupled to an RF transmitter in a communications or radar system, or to some other information-delivery system.

The present invention also features a method of modulating an optical signal. The method includes providing an optical pulse train comprising optical pulses having a predetermined frequency. The method also includes modifying the optical pulse train with a signal to produce one or more modulated optical pulse trains related to the signal and having an optical sub-carrier frequency related to the predetermined frequency of the optical pulse train. The signal may be an optical control signal independent of the optical pulse train.

The step of modifying the optical pulse trains with the signal may include removing pulses of the optical pulse train, delaying selected pulses from the pulse train, or switching pulses from one pulse train to another. In addition, the step of modifying the optical pulse train with the signal may include performing an optical logical function of the optical pulse train and the optical control signals.

The present invention also features a method of generating an RF signal. The method includes providing an optical pulse train comprising optical pulses having a predetermined frequency. The method also includes modifying the optical pulse train with a signal to produce one or more modulated optical pulse trains related to the signal and having an optical sub-carrier frequency related to the predetermined frequency of the optical pulse train.

In addition, the method of generating an RF signal includes detecting the modulated optical pulse trains with one or more detectors that generate RF signals corresponding to the modulated optical pulse trains. The signals may comprise optical control signals that are independent of the optical pulse train. Multiple detected signals may be combined. The method may include delivering the optical pulse trains to the detectors via an optical fiber cable. The method may also include filtering the RF signals with electrical filters to remove harmonic signals and to provide spectral shaping. The method may also include amplifying and transmitting the RF signals.

BRIEF DESCRIPTION OF THE DRAWINGS

This invention is described with particularity in the appended claims. The above and further advantages of this invention may be better understood by referring to the following description taken in conjunction with the accompanying drawings, in which:

FIG. 2b presents data illustrating optical logic functions performed with the pulse train modifier of FIG. 2a.

DETAILED DESCRIPTION

Figure 1:
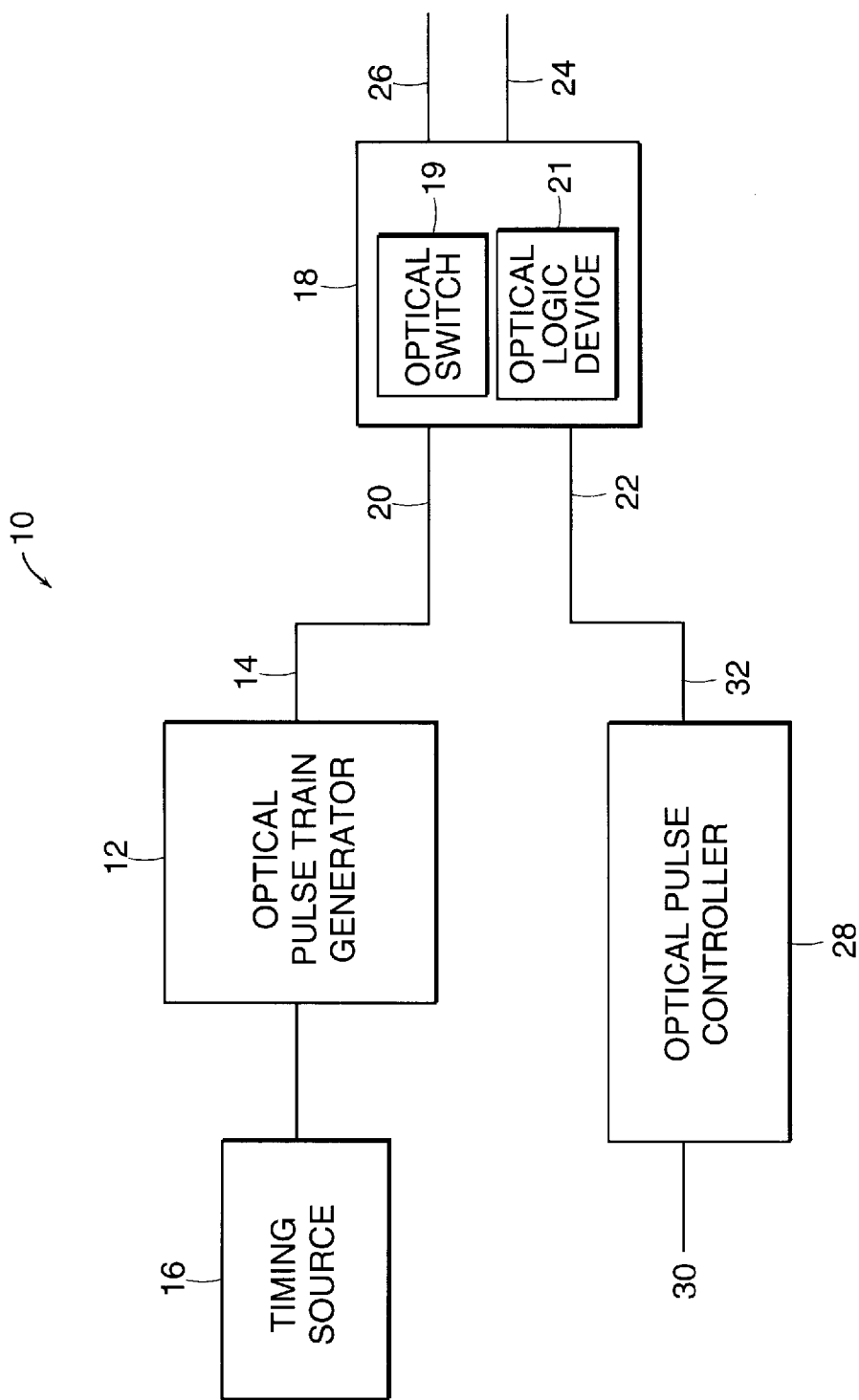
FIG. 1 illustrates a functional block diagram of one embodiment of an optical modulator of the invention.

FIG. 1 illustrates a functional block diagram of an embodiment of an optical modulator 10 of the invention. The optical modulator 10 includes an optical pulse train generator 12 that forms an optical pulse train of a predetermined frequency at a generator output 14. A timing source 16 may be used as a clock or frequency reference to drive the optical pulse train generator 12.

The optical pulse train generator 12 and timing source 16 may be any short pulse optical source. For example, a soliton pulse compression source may be used which generates ultra-fast optical pulse trains having frequencies up to or greater than 100 Ghz. These sources utilize an optical beat signal and pulse compression using a non-linear medium. Such a source is described in "100-*Ghz Soliton Pulse Train Generation Using Soliton Compression of Two Phase Side Bands from a Single DFB Laser*," E. A. Swanson et al., IEEE Photonics Technology Letters, Vol. 6, No. 10, October 1994, which is incorporated herein by reference.

The optical modulator 10 also includes an optical pulse train modifier 18 having a first input 20 optically coupled to the output 14 of the pulse train generator 12. The optical modulator 10 further includes a second input 22, a first optical output 24, and a second optical output 26. The pulse train modifier 18 produces modulated optical pulse trains at the first 24 and second output 26 that are related to a signal appearing at the second input 22 and that have an optical sub-carrier frequency related to the predetermined frequency of the optical pulse train at the first input 20. The signal appearing at the second input 22 may be data or a pseudo-random signal for generating a spread-spectrum function. The signal may be an optical control signal independent of the optical pulse train.

The pulse train modifier 18 may be electro-optical. The pulse train modifier 18 may also be an optical switch 19 or an optical logic device 21. For example, the pulse train modifier 18 may be an optical bit phase sensor such as the one described in connection with FIG. 2. Additional optical bit phase sensors are described in commonly owned co-pending U.S. Patent application, Ser. No. 08/615,428, titled "All Optical Bit Phase Sensing," which is incorporated herein by reference.

The pulse train modifier 18 may also comprise optical pulse removal logic that performs a logic function. For example, the logic function may be an AND function of the optical pulse train from the optical pulse train generator 12 and a NOT of the signal on the second input 22. For this logical function, when a pulse is present on the second input 22 of the pulse train modifier 18 along with a pulse on the first input 20, no pulse is generated by the pulse train modifier 18. However, when a pulse is not present on the second input 22 of the pulse train modifier 18 and a pulse is present on the first input 20, a pulse is generated by the pulse train modifier 18. Thus, the first 24 and second output 26 of the pulse train modifier 18 is a one-bit representation of digital samples of the desired modulated waveform.

The pulse train modifier 18 may also comprise optical switching logic. The optical switching logic function may also be an AND function of the optical pulse train from the optical pulse train generator 12 and a NOT of the signal on the second input 22. For this switching function, when a pulse is present on the second input 22 of the pulse train modifier 18 along with a pulse on the first input 20, the input pulse is switched from the first output 24 to the second output 26 of the pulse train modifier 18. In this way, complementary or differential signals may be created. These complementary signals may be used to create a richer set of signals.

Modulating an optical signal by removing or switching optical pulses is advantageous because pulse removal or switching logic can have a much greater tolerance to imperfections in the control sequence. If the control pulse is within the capture time of the removal or switching logic and not confused with previous and following control pulses, the desired pulse will be removed or switched without negative effects on the phase and amplitude properties of the remaining pulse train. Problems that limit prior art modulators such as path matching, band flatness, and switching speed limitation are eliminated with the present invention.

The optical modulator 10 may also include an optical pulse controller 28 having an input 30 and an output 32. The output 32 is coupled to the second input 22 of the optical pulse train modifier 18. The pulse controller 28 produces a modulation control signal at the output 32 that is utilized by the pulse train modifier 18 to modulate the optical pulse train.

Figure 2A:
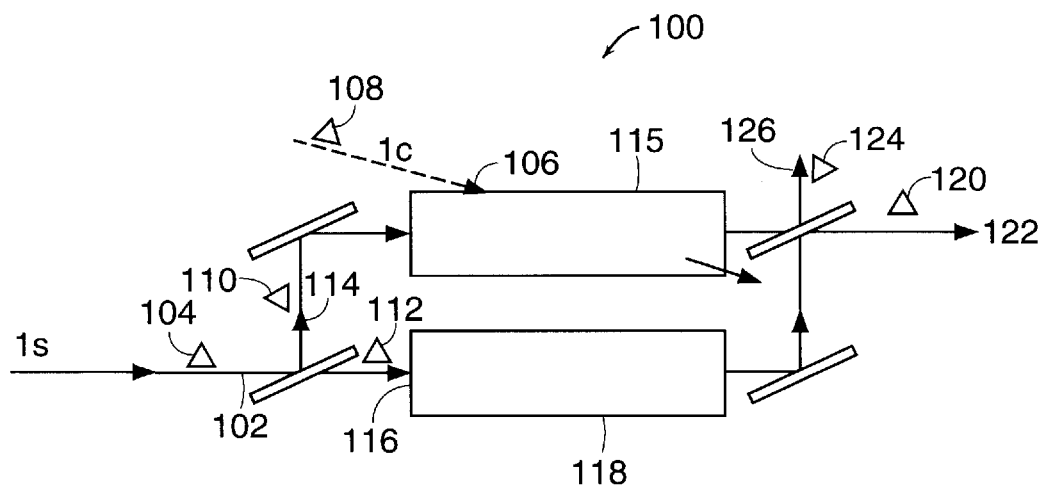
FIG. 2a is a schematic diagram of one embodiment of a pulse train modifier suitable for use in the optical modulator that embodies this invention.

FIG. 2a is a schematic diagram of one embodiment of a pulse train modifier suitable for use in the optical modulator that embodies this invention. The pulse train modifier includes a nonlinear interferometer 100. A Mach-Zehnder nonlinear interferometer configuration is illustrated in FIG. 2a, but a Sagnac, Michelson, single arm nonlinear, or other interferometer can also be utilized. A first input 102 of the nonlinear interferometer is optically coupled to the output 14 (FIG. 1) of the pulse train generator 12 and accepts an optical data signal 104. A second input 106 accepts an optical control signal 108.

In operation, the optical data signal 104 is split into a first 110 and a second optical beam 112 that propagates along a first 114 and a second optical path 116 respectively. A nonlinear medium 115 is positioned in the first optical path 110. A second medium 118 may be positioned in the second optical path 116. The optical control signal 108 is coupled into the first optical path 114 causing nonlinear index or transmission changes in the nonlinear material 115.

The interferometer 100 generates a first optical output signal 120, at a first output 122, having an intensity that is functionally related to the optical data signal 104 and the optical control signal 108. The interferometer 100 also generates a second optical output signal 124, at a second output 126, that is also functionally related to the optical data signal 104 and the optical control signal 108. The first 122 and the second output 124 of the interferometer 100 may be used alone or in combination to generate any desired Boolean logic function such as a NAND, AND, NOT, OR, and NOR function.

Figure 2B:
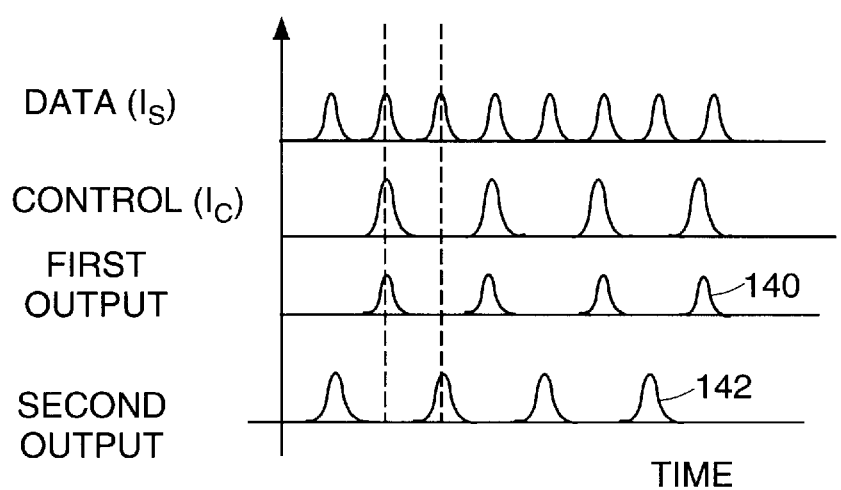

FIG. 2b presents data illustrating optical logic functions performed with the pulse train modifier 18 that comprises the interferometer 100. The first output 122 of interferometer 100 produces a waveform 140 that represents an AND function of optical data signal 104 and the optical control signal 108. The second output 124 of interferometer 100 produces a waveform 142 that represents an AND function of the optical data signal 104 and the NOT of the optical control signal 108.

Figure 3:
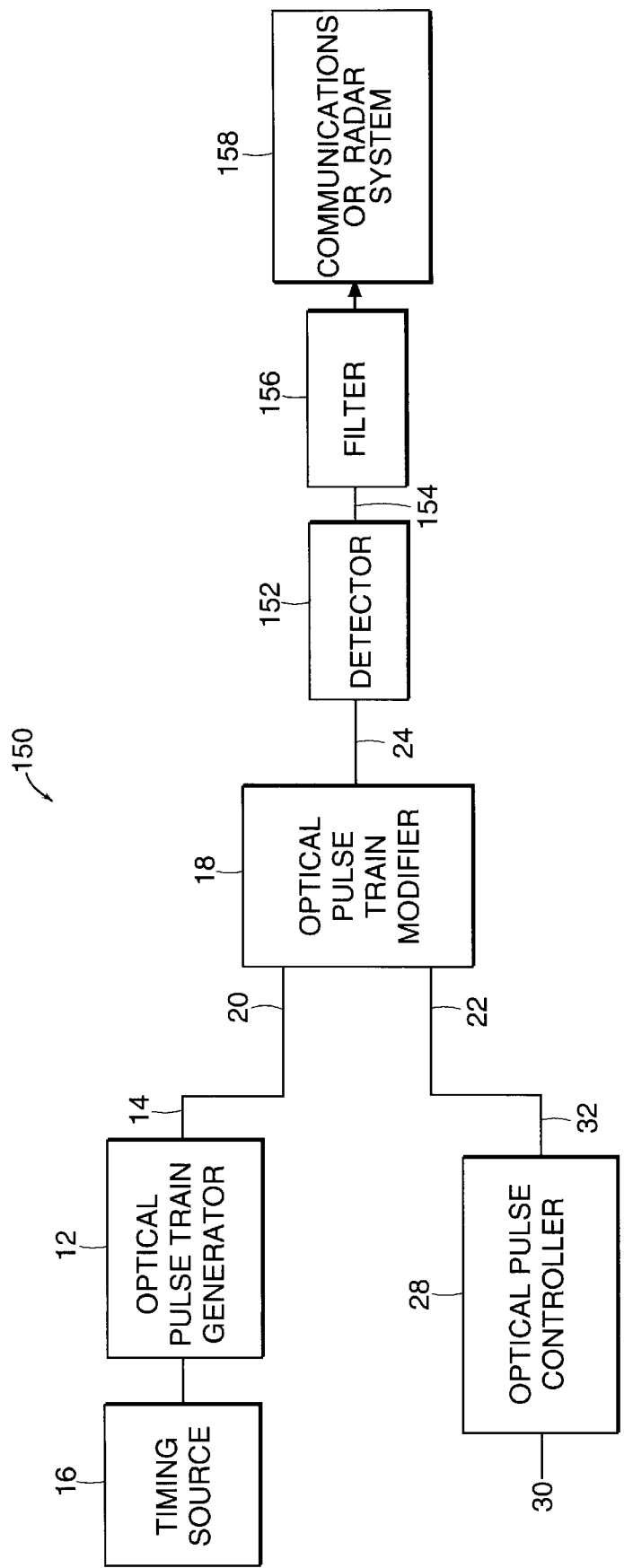
FIG. 3 illustrates a functional block diagram of one embodiment of a radio frequency signal generator of the invention.

FIG. 3 illustrates an embodiment of a functional block diagram of a radio frequency signal generator 150 of the invention. The RF signal generator 150 includes the modulator described in connection with FIG. 1. In addition, the signal generator 150 includes a detector 152 that is optically coupled to the optical output 24 of the pulse train modifier 18. The detector 152 has adequately wide bandwidth to detect the modulated optical pulse train. The detector 152 generates a modulated RF signal at an RF output 154 that corresponds to the modulated optical pulse train generated by the pulse train modifier 18. The modulated RF signal may have a fractional bandwidth anywhere from 0–100%.

If multiple signals have been created by the pulse train modifier, these signals may be detected separately, and combined to create a modulated RF signal. For example, complementary modulated pulse train signals may be detected and subtracted. This configuration allows pulses, which carry information about magnitude, but not the sign, to generate RF signals corresponding to positive-going and negative-going components of the desired RF signal. These positive-going and negative-going RF components can be subtracted to form the fully embodied RF signal. In this way a richer set of signals is achievable using the signal generator.

The signal generator 150 may also include an electrical filter 156 electrically coupled to an output 154 of the detector 152. The filter 156 may be used for removing harmonic signals from the modulated RF signal. In addition, the filter 156 may be used for providing spectral shaping for the modulated RF signal. The output 154 of the detector 152 may be electrically coupled to an amplifier (not shown) and then to an RF transmitter (not shown) in a communications system (158) or a radar system. The detector 152 may be optically coupled to the output of the pulse train modifier 18 by a fiber optic cable (not shown).

Figure 4:
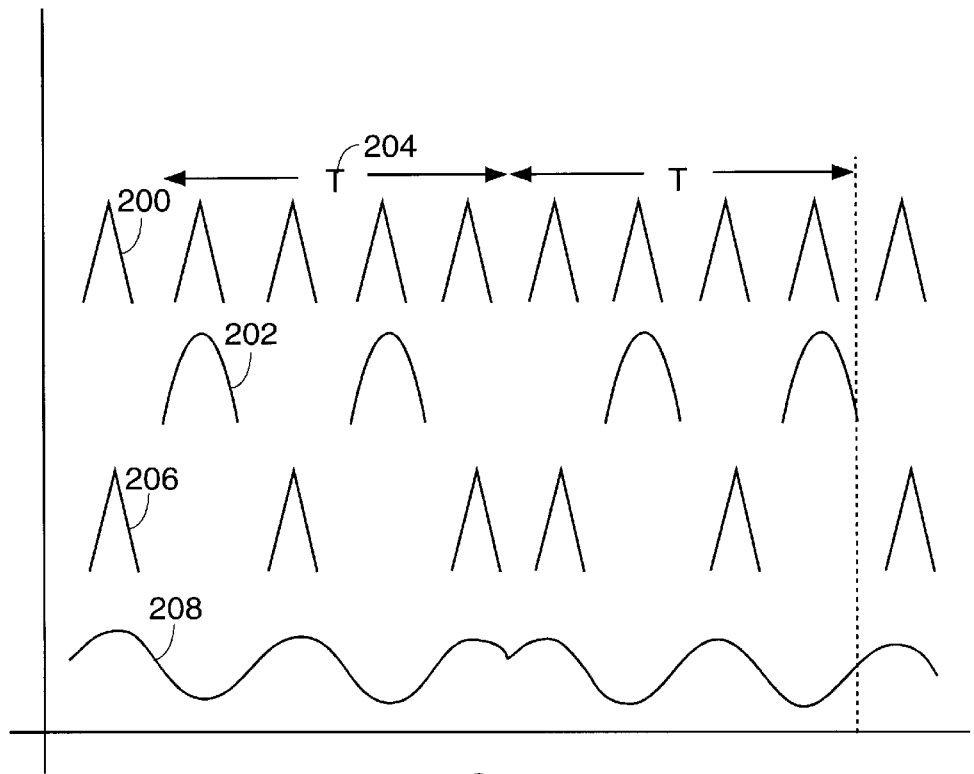
FIG. 4 illustrates a phase-shift-keyed (PSK) modulated waveform that can be generated by the modulator that embodies the invention.

The modulator that embodies the invention may be used to convey data in the phase or amplitude of the carrier signal. FIG. 4 illustrates a phase-shift-keyed (PSK) modulated waveform that can be generated by the modulator that embodies the invention. In operation, an optical pulse train 200 is generated at a frequency ($2f$) that is twice the desired modulated carrier frequency (f) and is applied to the first input 20 (FIG. 1) of the pulse train modifier 24. An optical control signal 202 is applied to the second input 22 of the pulse train modifier 24.

During each bit period (T) 204, the pulse train modifier 18 (FIG. 1) removes either the even pulses or the odd pulses, depending on whether the bit was a one or a zero. The output 24 of the pulse train modifier 18 is a modulated optical pulse train 206 that is related to the optical control signal 202 and that has an optical sub-carrier frequency (f) that is related to the predetermined frequency ($2f$) of the optical pulse train 200. The modulated optical pulse train 206 is then detected and filtered to form a phase modulated waveform 208.

The modulator 10 described in connection with FIG. 1 can have extremely wide bandwidth modulation on an RF carrier. The data illustrated in FIG. 4 shows a 50% fractional bandwidth modulation since the symbol period includes 4 pulses at $2f$. That is, each modulated symbol will include 2 pulses (and hence two cycles of the RF carrier).

Utilizing an optical pseudo-random sequence generator for generating the optical control pulses and modulation at fractional bandwidths of 25–50% or higher can produce extremely wide-band spread spectrum waveforms. Such waveforms are useful for anti-jam, low-probability of intercept or detection, or multiple access systems. A suitable optical pseudo-random sequence generator is described in commonly owned U.S. Pat. No. 5,566,261 titled, "Optical Memory and Data Pattern Generator," which is incorporated herein by reference.

Figure 5:
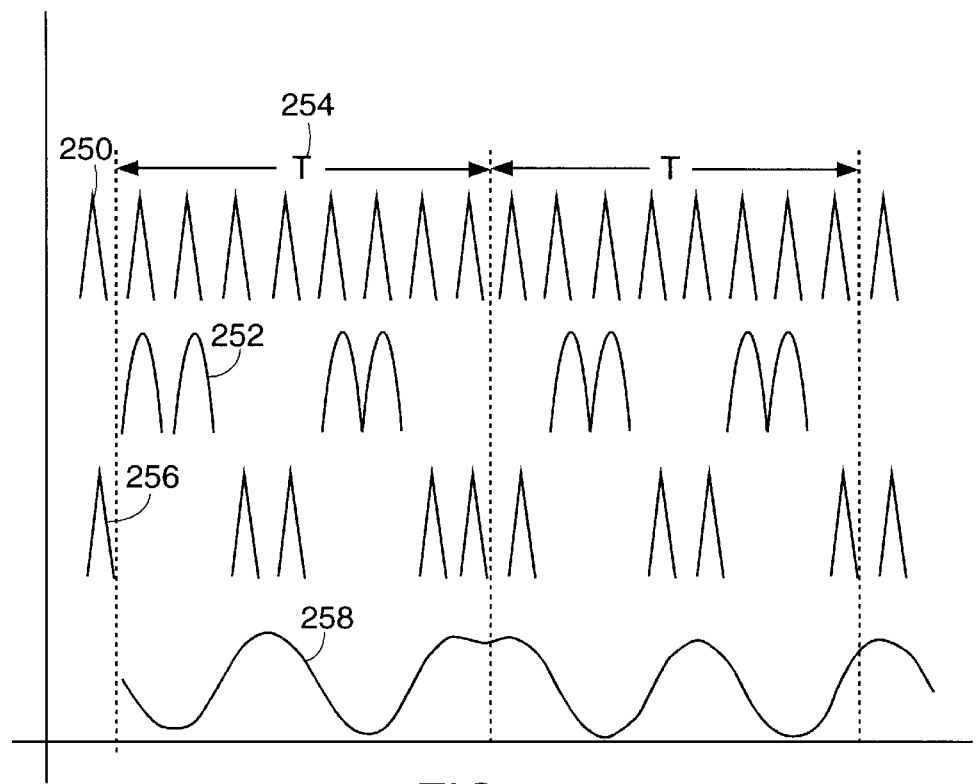
FIG. 5 illustrates a quadrature phase-shift-keyed (QPSK) modulated waveform that can be generated by the modulator that embodies the invention.

FIG. 5 illustrates a quadrature phase-shift-keyed (QPSK) modulated waveform that can be generated by one embodiment of the modulator that embodies the invention. In operation, an optical pulse train 250 is generated at a frequency (4*f*) that is four times the desired modulated carrier frequency (*f*) and applied to the first input 20 (FIG. 1) of the pulse train modifier 18. An optical control signal 252 is applied to the second input 22 of the pulse train modifier 18.

During each bit period (T) 254, the pulse train modifier 18 (FIG. 1) removes two of every four pulses, selected according to the desired relative phase of the symbol, as shown in the FIG. 5. The output 24 of the pulse train modifier 18 is a modulated optical pulse train 256 related to the optical control signal 252 and having an optical sub-carrier frequency (*f*) related to the predetermined frequency (4*f*) of the optical pulse train 250. The modulated optical pulse train 256 is then detected and filtered to form a phase modulated waveform 258.

The present invention is not limited to phase modulation. The optical control signal can be any binary sequence with sufficiently rich spectral and temporal details. For example, frequency, amplitude and other modulation forms can also be generated with the modulator described in FIG. 2.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An optical modulator comprising:
   (a) an optical pulse train generator forming an optical pulse train of a predetermined frequency at a generator output;
   (b) an optical pulse train modifier having a first input optically coupled to the output of the pulse train generator, a second input, and one or more optical outputs,
      wherein, the modifier producing one or more modulated optical pulse trains at the one or more optical outputs, each pulse train being produced in response to a signal appearing at the second input and having an optical sub-carrier frequency related to the predetermined frequency of the optical pulse train at the first input; and
   (c) an optical pulse controller having an input and an output, the output being coupled to the second input of the optical pulse train modifier, the controller producing a modulation control signal at the output that modulates the optical pulse train.

2. The modulator of claim 1 further comprising one or more detectors being optically coupled to one of the optical outputs of the pulse train modifier, each detector generating a modulated RF signal at an output that corresponds to the modulated optical pulse train generated by the pulse train modifier.

3. The modulator of claim 2 wherein multiple detector outputs are combined to generate a single RF signal.

4. The modulator of claim 2 wherein the detector is optically coupled to the output of the pulse train modifier by a fiber optic cable.

5. The modulator of claim 2 further comprising one or more electrical filters that are electrically coupled to each output of the detector.

6. The modulator of claim 2 wherein the output of the detector is electrically coupled to an RF transmitter in a communications system, to a radar system or to an information delivery system.

7. The modulator of claim 2 wherein the modulated RF signal has a fractional bandwidth of substantially between 0–100%.

8. The modulator of claim 1 wherein the signal appearing at the second input comprises data or a random signal.

9. The modulator of claim 1 wherein the pulse train modifier comprises an optical switch.

10. The modulator of claim 1 wherein the pulse train modifier comprises an optical logic device.

11. The modulator of claim 1 wherein the pulse train modifier comprises a non-linear optical loop mirror.

12. A radio frequency signal generator comprising:
   a) an optical pulse train generator forming an optical pulse train of a predetermined frequency at a generator output;
   b) an optical pulse train modifier having a first input optically coupled to the output of the pulse train generator, a second input, and one or more optical outputs,
      wherein, the modifier producing one or more modulated optical pulse trains related to a signal appearing at the second input and having an optical sub-carrier frequency related to the predetermined frequency of the optical pulse train at the first input; and
   c) one or more detectors, each detector having an output and being optically coupled to an optical output of the pulse train modifier, each detector generating a modulated RF signal at the output corresponding to the modulated optical pulse train generated by the pulse train modifier.

13. A radio frequency signal generator comprising:
   (a) an optical pulse train generator forming an optical pulse train of a predetermined frequency at a generator output;
   (b) an optical pulse train modifier having a first input optically coupled to the output of the pulse train generator, a second input, and one or more optical outputs,
      wherein, the modifier producing one or more modulated optical pulse trains related to a signal appearing at the second input and having an optical sub-carrier frequency related to the predetermined frequency of the optical pulse train at the first input;
   (c) an optical pulse controller having an input and an output, the output being coupled to the second input of the optical pulse train modifier, the controller producing a modulation control signal at the output that modulates the optical pulse train; and
   (d) one or more detectors, each detector having an output and being optically coupled to an optical output of the pulse train modifier, each detector generating a modulated RF signal at the output corresponding to the modulated optical pulse train generated by the pulse train modifier.

14. The signal generator of claim 13 wherein multiple detector outputs are combined to generate a single RF signal.

15. The signal generator of claim 13 wherein the output of the detector is electrically coupled to an RF transmitter in a communications system or to a radar system.

16. The signal generator of claim 13 further comprising one or more electrical filters electrically coupled to one or more of the outputs of the one or more detectors.

17. A method of modulating an optical signal comprising:
   a) providing an optical pulse train comprising optical pulses having a predetermined frequency; and
   b) modifying the optical pulse train with an optical control signal that is independent of the optical pulse train thereby generating one or more modulated optical pulse trains that are related to the signal and having an optical sub-carrier frequency that is related to the predetermined frequency of the optical pulse trains.

18. The method of claim 17 wherein the step of modifying the optical pulse train with the signal in step b) comprises removing pulses of the optical pulse train.

19. The method of claim 17 wherein the step of modifying the optical pulse train with the signal in step b) comprises delaying selected pulses from the pulse train.

20. The method of claim 17 wherein the step of modifying the optical pulse train with the signal in step b) comprises optically performing a logical AND function of the optical pulse train and a NOT of the optical control signals.

21. A method of generating an RF signal comprising:
   a) providing an optical pulse train comprising optical pulses having a predetermined frequency;
   b) modifying the optical pulse train with an optical control signal that is independent of the optical pulse train thereby generating one or more modulated optical pulse trains that are related to the signal and having an optical sub-carrier frequency that is related to the predetermined frequency of the optical pulse train; and
   c) detecting the modulated optical pulse trains with one or more detectors that generate RF signals corresponding to the modulated optical pulse trains.

22. The method of claim 21 further comprising the step of filtering the RF signal generated in step c) with an electrical filter to remove harmonic signals and to provide spectral shaping.

23. The method of claim 21 further comprising the step of amplifying and transmitting the RF signal generated in step c).

* * * * *